May 3, 1966  R. NEUSCHOTZ  3,249,141
DEFORMED LOCKING THREAD WITH RELIEVED AREAS
Filed July 16, 1962
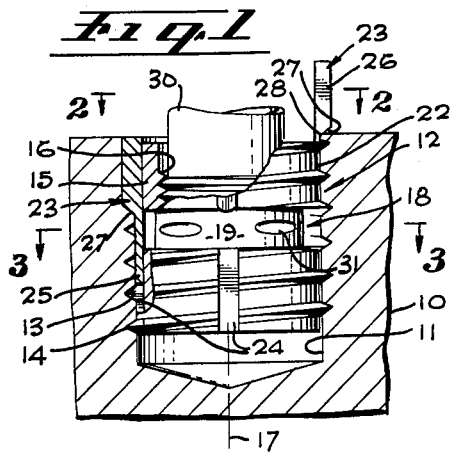
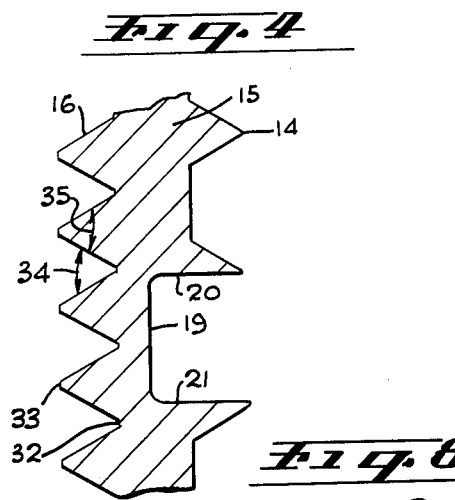
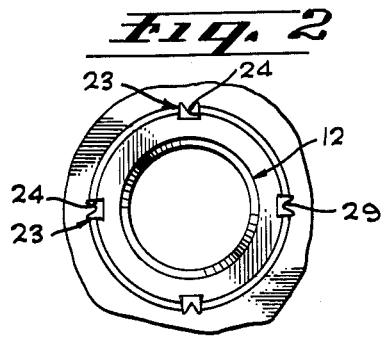
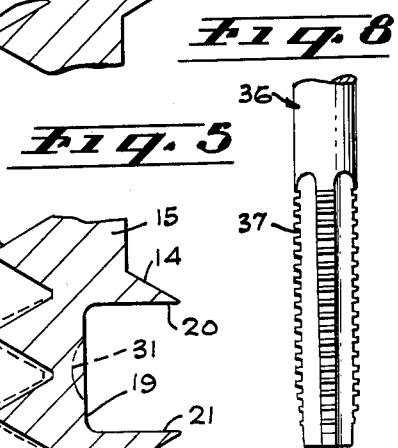
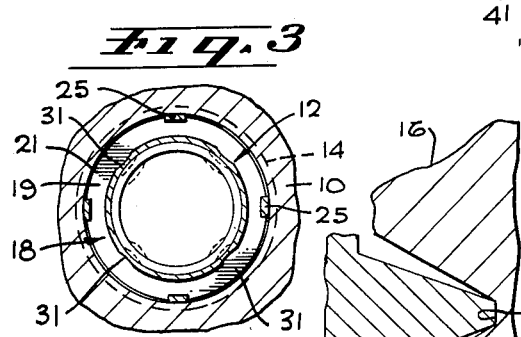
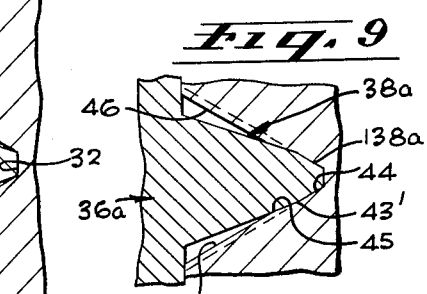
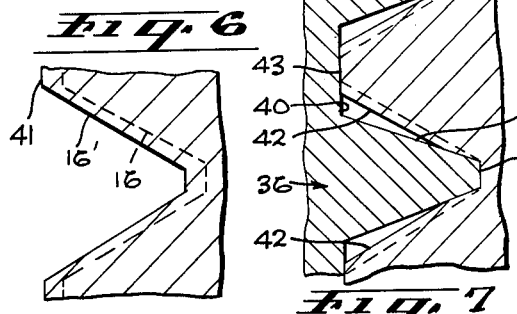
INVENTOR.
ROBERT NEUSCHOTZ
BY William P. Green
ATTORNEY United States Patent Office 3,249,141
Patented May 3, 1966

3,249,141
DEFORMED LOCKING THREAD WITH
RELIEVED AREAS
Robert Neuschotz, 1162 Angelo Drive,
Beverly Hills, Calif.
Filed July 16, 1962, Ser. No. 210,088
1 Claim. (Cl. 151—21)

This invention relates to an improved type of self-locking threaded element, adapted to engage a coacting threaded member with sufficiently tight frictional engagement to effectively retain the parts against unwanted unscrewing movement. The present application is closely related to my copending application Serial Number 209,-947, entitled "Method of Forming Self Locking Threaded Elements," filed of even date herewith, now issued as United States Patent Number 3,169,258, which patent covers certain features of novelty residing in a preferred method for forming the products covered by the present invention.

There have heretofore been proposed certain self-locking threaded elements in which some of the threads have been purposely shaped or deformed to a condition in which they form a tight interference type fit with a coacting threaded member, to frictionally retain the parts against separation. The self-locking threaded elements embodying the present invention are of this general type, but incorporate certain improvements serving to increase the effectiveness of the self-locking action, and to adapt the threaded element for repeated connection to and detachment from the mating part, with an effective self-locking action being attained each time that the parts are connected together, and without the usual loss of frictional locking effectiveness which customarily results from connecting two self-locking parts together and then detaching them.

From careful study of the threads of prior types of self-locking elements after use, I have learned that the reason for loss of effectiveness of such elements after one or relatively few uses resides in the fact that the design of the threads is ordinarily such that the threads are actually damaged by connection to a mating part. More specifically, the tight binding engagement of the threads of one part with threads of another part causes the peaks of the threads to develop burrs, or in some cases to actually fuse and weld together, with the result that it may be very difficult to separate the parts when it is desired to disconnect them, and after such disconnection the threads may be so damaged as to have lost all locking effectiveness.

In a self-locking element embodying the present invention, the threads are purposely so designed that certain of their peak portions have a less tight frictional engagement with the mating threaded part than in prior similar self-locking devices. Preferably, both the major and minor diameter portions of the threads are relieved so that the primary binding and self-locking tight fitting engagement of the threads with a coacting part is radially intermediate the major and minor diameter locations. At these intermediate points, the threads are much stronger than at the peaks or major and minor diameter locations, and can withstand damage even though the interengagement of the threads is very tight and has high frictional characteristics, whereas the same amount of friction in the same tightness of fit at the thread peaks would damage those peaks and destroy the effectiveness of the thread interlock.

Structurally, the changed cross-sectional configuration of the threads may be defined by reference to the cross-section of the helical groove formed between two successive thread turns. At the location at which the threads have their self-locking action, this cross-section may be considered as defined by two opposite side walls of the groove, which side walls converge toward one another and preferably are relieved (desirably cut away) at the deepest portion of the groove, to form an area at that location which is wider than would be the case if the converging walls were to continue at their initial rate to the depth of the groove. Thus, the relieved area is wide enough to receive the peak of a mating thread in a manner avoiding any possibility of tight binding of the parts at that location. When the self-locking thread is an internal thread formed with an insert or the like, the discussed relieved area is at the major diameter of the thread, and to maximize the effect of the invention, the minor diameter of the thread is also desirably relieved or cut away to avoid binding of the parts at that location.

The above and other features and objects of the present invention will be better understood from the following detailed description of the typical embodiments illustrated in the accompanying drawing, in which:

FIG. 1 is a partially sectional view through an insert embodying the invention, shown positioned within a carrier part, and having a mating threaded stud connected to the insert;

FIG. 2 is a plan view taken on line 2—2 of FIG. 1;

FIG. 3 is a cross-section taken on line 3—3 of FIG. 1;

FIG. 4 is an enlarged fragmentary axial section through a portion of the side wall of the FIG. 1 insert, shown prior to deformation of the side wall in forming the self-locking threads;

FIG. 5 is a view similar to FIG. 4 but showing in broken lines the manner in which the threads are locally deformed;

FIG. 6 is a further enlarged view similar to FIG. 5, but showing in full lines a portion of the deformed thread area;

FIG. 7 shows the manner in which the major and minor diameter portions of the FIG. 6 thread are relieved by a tap or similar thread forming element;

FIG. 8 shows the tap that may be used in the FIG. 7 operation; and

FIG. 9 shows a variational type of tap for cutting the threads in a somewhat different manner.

With reference first to FIG. 1, I have shown at 10 a carrier part containing a bore 11 into which a threaded insert 12 is connected. Bore 11 has internal threads 13 which are engageable with external threads 14 on the insert, so that the insert may be screwed into its illustrated position of reception within the carrier part.

Insert 12 has a generally tubular body 15 which may be formed of metal, such as steel, with external threads 14 being formed about the outside of the body, and internal threads 16 being formed within the body, all centered about an axis 17. At a location midway between its axially inner and outer ends, tubular body 15 of the insert has an annular external groove 18, which may be defined by a cylindrical wall 19 (FIG. 4) centered about axis 17, and two parallel annular walls 20 and 21 disposed transversely of axis 17. Groove 18 extends into the material of the insert body radially inwardly beyond the minor diameter portions 22 of threads 14, to interrupt those threads at the location of the groove, and provide a relatively thin walled portion of the insert at the groove.

The insert is locked in the FIG. 1 installed position within carrier part 10 by means of one or more (preferably four) locking keys 23, which initially are frictionally held in the position of the right hand one of these keys in FIG. 1, relative to insert body 15, and are adapted to be driven axially relative to the body to lock the insert in the carrier part. Each key 23 is received within an axially extending groove 24 formed in the outer surface of the insert (and interrupted at the location of groove 18). The axial grooves 24 have the dove-tail ross-sectional configuration illustrated in FIG. 2, and the keys are of similar cross-section, and guided by the dove-tail shape of the grooves for only axial movement relative to insert body 15. Each key has an axially inner portion 25 which is radially thin enough to be received entirely within the minor diameter of threads 14, so that portion 25 will not interfere with screwing of the insert into the carrier part. The axially outer portion 26 of each key is thicker radially, and projects beyond the minor diameter of threads 14, and preferably approximately as far as the major diameter of those threads. Each key is initially so positioned that its large portion 26 projects axially outwardly to the position of the right hand key in FIG. 1, with the thin portion 25 being received within the corresponding groove 24, and tightly frictionally retained by that groove in a manner such that the keys will not move axially within the grooves in normal handling. When the insert is screwed into position, the shoulders 27 formed at the inner ends of enlarged portions 26 of the keys act to engage the outermost edge 28 of bore 11, to limit the extent to which the insert may be screwed into bore 11, and thus accurately locate the insert therein. When the insert has reached this position, keys 23 are driven axially to the position of the left hand key in FIG. 1, to cut into the material of carrier part 10, and thereby effectively lock the insert against unscrewing rotation. To increase the effectiveness of the keying action, the enlarged portion 23 of each key may contain a groove 29 (FIG. 3) dividing the enlarged portion into two cutting edges for cutting into and deforming the material of part 10.

After the insert has been installed in part 10 in the above discussed manner, a coacting externally threaded stud or bolt (30 in FIG. 1) may be screwed into engagement with internal threads 16. The present invention is primarily concerned with the manner in which insert 12 is designed to have a self-locking action with this stud or bolt. Such a self-locking action is provided by locally deforming the side wall of the insert body at the location of groove 18, typically at four evenly circularly spaced locations as represented at 31 in FIG. 1. FIGS. 4 through 7 represent various steps followed in thus deforming and subsequently retapping the internal threads within the insert.

Initially, the insert is formed to the condition of FIG. 4, in which the major diameter portions 32 and minor diameter portions 33 of threads 16 are of uniform diameter along the entire axial extent of these threads. The threads 16 may have the conventional cross-section of "standard" 60° threads, that is, with the angles 34 and 35 both being 60°.

After the threads have been formed to the initial condition of FIG. 4, the four locally deformed areas 31 are formed within groove 18, as by striking radially inward blows against surface 19 at the desired locations by a hammer or other impact tool. Thus, the side wall is deformed inwardly to the broken line position of FIG. 5, so that the internal threads 16 are deformed inwardly to the reduced diameter condition also represented in broken lines in FIG. 5. FIG. 6 shows in full lines this deformed condition of the threads which are just opposite each of the locations 31, with the initial condition of the threads, prior to deformation, being represented in broken lines in FIG. 6. The broken lines of FIG. 6 may also be considered as representing the outer surface of the threads formed on stud 30 which is to be screwed into the insert.

After the threads 16 have been locally deformed to the condition of FIG. 6, a tap such as that represented at 36 in FIG. 8 is screwed into insert 16, to engage threads 16 and remove portions of those threads at the deformed areas 31. Tap 36 may be of completely conventional construction, except as to the cross-section of its cutting teeth or elements 37, whose cutting edges 38, 39 and 40 (FIG. 7) determine the cross-section of the cut made in the insert. With reference to FIG. 7, it is noted first of all that the major diameter cutting edges 39 of tap 36 are desirably of the same diameter as the major diameter portions 32 of threads 16, at the locations at which the threads have not been deformed. Also, the cutting edges 39 may have the same axial extent as the undeformed major diameter portions of the threads, and the corresponding major diameter portions of the external threads of the stud 30.

The minor diameter cutting edges 40 of tap 36 are of a diameter corresponding to the initial undeformed minor diameter portions 43 of threads 16, and therefore the corresponding minor diameter portions of the external threads of stud 30, to cut off the inwardly deformed peak portions 41 of threads 16'. Thus, the tap acts to cut away or relieve both the major and minor diameter portions of the deformed threads. To avoid simultaneous cutting away of the deformed areas radially between the major and minor diameter portions of the deformed threads, the two side cutting edges 38 of tap 36 extend at an angle less than 60° relative to one another, preferably at about 40° to one another, as shown. Thus, the portions 42 of the deformed threads are not cut away. It is further noted that the cross-section of the cutting portion of the tap is such that it can be screwed into and past the undeformed portions of threads 16, without cutting those portions in any way.

After the tap 36 has been removed from the insert, and the insert has been installed to the FIG. 1 position, stud 30 may be screwed into threads 16, and will have a very effective self-locking action therewith. The nature of this self-locking action will be apparent from FIG. 7, in which the broken lines representing the initial undeformed condition of threads 16 may also be considered as representing the external shape of the threads of stud 30. It is noted that these threads of the stud will fit with relatively little deformation within the major diameter portions of the deformed threads of insert 12, and will similarly engage the minor diameter portions of threads 16 with less binding than would occur if those minor diameter portions 41 had not been cut off. The primary self-locking tight fitting action will be attained at the locations of surfaces 42 which have not been removed by the final tapping operation. In actual practice, inserts formed in this manner have proved effective to lock a stud in the insert very positively, and have been capable of doing this repeatedly without damage to the locking threads.

FIG. 9 shows a variational type of tap 36a which may be utilized in place of the tap 36 of FIG. 7. Tap 36a is identical with tap 36 except that edges 38a have radially outer portions 138a at a 60° angle to one another, rather than a 40° angle, to coincide exactly with the initial major diameter cross-section of insert threads 16a, so that a mating stud will not bind even slightly at this location. Radially inwardly of point 43 in FIG. 9, edges 38a are at 40° to one another. Thus, the surfaces of the deformed portions of the threads 16a have outer portions 44 at 60° to one another, then short 40° portions at 45, and inner portions 46 disposed at the initial 60° angle as altered by the deformation of the threads.

I claim:

A self locking element having an internal thread defining a groove between successive turns of the thread adapted to receive and interfit with a mating external thread of a coacting member, said groove having along the major portion of its helical extent a predetermined uniform basic cross section defined by two side walls of adjacent internal thread turns which, in advancing radially outwardly, converge toward one another at a 60 degree angle for non-interfering reception of said mating external thread, said internal thread being locally deformed radially inwardly at a plurality of circularly spaced locking locations, said groove of the internal thread having an altered cross section at said circularly spaced locking locations which is different from said basic cross section as it occurs at areas circularly between said locking locations and axially therebeyond and which is constructed to interfit more tightly and in self-locking relation with said mating thread, said altered cross section of the groove being defined by two opposite side walls having radially inner first portions which, in advancing radially outwardly, converge angularly toward one another at a 60 degree angle but are spaced closer together than are corresponding portions of the basic cross section to attain a self-locking action, said side walls of said altered cross section having second portions at the radially outer extremity of the groove which are spaced apart more nearly in correspondence with the corresponding portions of said basic cross section to avoid too tight a thread interfit with said coacting member deep in the groove, said internal thread having a minor diameter crest which is at the same diameter at said circularly spaced locking locations as at the locations of said basic cross section, said internal thread having a major diameter at said locking locations which is as great as its major diameter at the locations of said basic cross-section, said first portions of said walls of said altered cross section continuing radially inwardly to the inner extremity of said crest and at said innermost extremity of the crest being spaced closer to one another than are said walls of the basic cross section at said crest, said innermost portion of the crest at said locking locations being wider axially than the corresponding innermost crest portion of the basic cross section.

References Cited by the Examiner

UNITED STATES PATENTS

| | | | |
|---|---|---|---|
| 1,369,156 | 2/1921 | Woodward | 151—22 |
| 1,451,484 | 4/1923 | Woodward | 151—22 |
| 2,387,375 | 10/1945 | Whyland | 151—22 |
| 2,567,483 | 9/1951 | Hotine | 85—46 |
| 2,581,690 | 1/1952 | Moehle et al. | 151—22 |
| 2,754,871 | 7/1956 | Stoll | 151—21 |
| 3,029,856 | 4/1962 | Abbott | 151—21 |

FOREIGN PATENTS 1,268,069  6/1961  France.

EDWARD C. ALLEN, *Primary Examiner.*

C. B. ELDERKIN, *Assistant Examiner.*